United States Patent
Kim et al.

(10) Patent No.: US 10,169,839 B2
(45) Date of Patent: Jan. 1, 2019

(54) METHOD AND APPARATUS FOR EXECUTING GRAPHICS PIPELINE

(71) Applicant: Samsung Electronics Co., Ltd., Suwon-si (KR)

(72) Inventors: Changmoo Kim, Seoul (KR); Yeongon Cho, Hwaseong-si (KR); Soojung Ryu, Hwaseong-si (KR); Woong Seo, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 127 days.

(21) Appl. No.: 15/098,638

(22) Filed: Apr. 14, 2016

(65) Prior Publication Data
US 2017/0098294 A1    Apr. 6, 2017

(30) Foreign Application Priority Data

Oct. 5, 2015  (KR) .................. 10-2015-0139992

(51) Int. Cl.
| | | |
|---|---|---|
| *G06T 1/20* | (2006.01) | |
| *G06T 1/60* | (2006.01) | |
| *G06T 15/00* | (2011.01) | |

(52) U.S. Cl.
CPC .............. *G06T 1/20* (2013.01); *G06T 1/60* (2013.01); *G06T 15/005* (2013.01); *G06T 2200/28* (2013.01)

(58) Field of Classification Search
None
See application file for complete search history.

(56) References Cited

U.S. PATENT DOCUMENTS

| | | | | |
|---|---|---|---|---|
| 5,864,342 A | * | 1/1999 | Kajiya | G06T 11/001 345/418 |
| 6,232,974 B1 | * | 5/2001 | Horvitz | G06F 9/50 345/419 |
| 6,313,838 B1 | * | 11/2001 | Deering | G06T 15/00 345/420 |
| 2015/0379672 A1 | * | 12/2015 | Wang | G06T 15/80 345/423 |

OTHER PUBLICATIONS

Johan Bergman, "Energy Efficient Graphics: Making the Rendering Process Power Aware", 2010, Thesis, Uppsala University.*

* cited by examiner

*Primary Examiner* — Robert Bader
(74) *Attorney, Agent, or Firm* — F. Chau & Associates, LLC

(57) ABSTRACT

A method of executing a graphics pipeline includes calculating, while executing the graphics pipeline on a current frame, a resource for processing properties of an object included in a following frame, determining, based on a result of the calculating, whether to perform a pre-process for the object included in the following frame, performing the pre-processing, when the pre-process is determined to be performed, comprising transforming the properties of the object that are to be processed in a graphics pipeline for the following frame, and executing, when the pre-process is to be performed, the graphics pipeline for the following frame by using the transformed properties of the object.

8 Claims, 16 Drawing Sheets

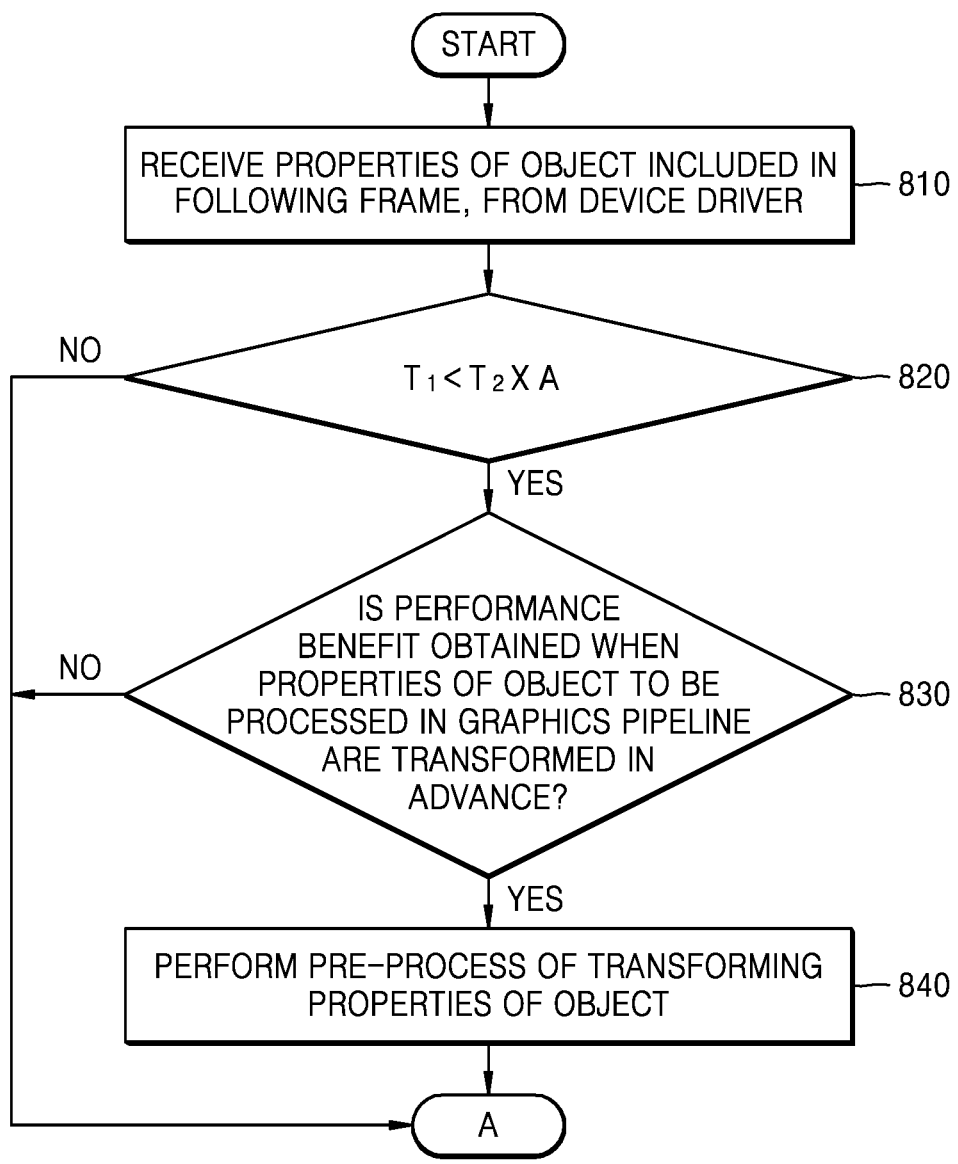

METHOD AND APPARATUS FOR EXECUTING GRAPHICS PIPELINE

CROSS-REFERENCE TO RELATED APPLICATION

This application claims the benefit under 35 USC 119(a) of Korean Patent Application No. 10-2015-0139992, filed on Oct. 5, 2015, in the Korean Intellectual Property Office, the disclosure of which is incorporated herein in its entirety by reference.

BACKGROUND

1. Field

The following description relates to a method and apparatus for executing a graphics pipeline.

2. Description of the Related Art

A rendering system refers to an apparatus for graphics processing and displaying content. A rendering system may include, for example, personal computers (PCs), laptop computers, video game consoles, and embedded devices such as smartphones, table devices, and wearable devices. A graphics processor included in the rendering system may generate a frame to be displayed, by transforming graphics data of 2-dimensional (2D) or 3-dimensional (3D) objects into 2D pixels.

The embedded devices such as smartphones, tablet devices, and wearable devices may have problems such as a low processing ability and large power consumption. Thus, the embedded devices may not exhibit the same graphics processing performance as workstations such as PCs, laptop computers, and video game consoles that have relatively greater memory space and processing power. Due to a recent increase in the usage of mobile devices such as smartphones and tablet devices, users may frequently engage in processing-intensive activities such as playing games or watching video content using smartphones and tablet devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Provided are a method and apparatus for performing a pre-process of transforming a property of an object in a frame before executing a graphics pipeline.

According to an embodiment, a method of executing a graphics pipeline includes calculating, while executing the graphics pipeline on a current frame, a resource for processing properties of an object included in a following frame, determining, based on a result of the calculating, whether to perform a pre-process for the object included in the following frame, performing the pre-processing, when the pre-process is determined to be performed, comprising transforming the properties of the object that are to be processed in a graphics pipeline for the following frame, and executing, when the pre-process is to be performed, the graphics pipeline for the following frame by using the transformed properties of the object.

The calculating of the resource may include calculating the resource when the pre-process is finished before executing the graphics pipeline for the following frame.

The method of claim may further include determining a time point at which the pre-process ends based on a time for loading the properties of the object from a memory, where the time for loading is based on a size of the properties of the object.

The calculating of the resource may further include determining a rendering progress rate of the current frame and a usage rate of a memory, and determining a time point at which the graphics pipeline for the following frame starts based on the rendering progress rate of the current frame and the usage rate of the memory.

The calculating of the resource may further include calculating based on information included in a drawcall related to the following frame.

The calculating of the resource may further include calculating a time or power for performing the pre-process of transforming the properties of the object.

The determining of whether to perform the pre-process may include determining based on a time or power for performing the pre-process, a time or power for transforming the properties of the object in the graphics pipeline, and usage frequency of the object.

When the graphics pipeline is a graphics pipeline for tile-based deferred rendering, the pre-process may be performed before a pass for tile binning.

When the properties of the object are related to a location of the object, the pre-process may include transforming coordinates of the location.

When the properties of the object in the following frame are related to a location allocated in a memory to store the object, the pre-process may include changing the location allocated in the memory.

A non-transitory processor-readable recording medium having recorded thereon coding to control one or more processor devices may implement the method.

According to an embodiment, a graphics processor executing a graphics pipeline includes graphics pipelines; and a controller configured to: calculate a resource for processing properties of an object included in a following frame while executing one of the graphics pipelines for a current frame, determine, based on a result of the calculating, whether to perform a pre-process, perform the pre-process, when the pre-process is determined to be performed, comprising transforming the properties of the object that are to be processed in one of the graphics pipelines for the following frame, and execute, when the pre-process is to be performed, the one graphics pipeline for the following frame by using the transformed properties of the object.

The controller may calculate the resource when the pre-process is finished before executing the graphics pipeline for the following frame.

The controller may determine a time point when the pre-process ends, based on a time for loading the properties of the object from a memory, and the time for loading may be based on a size of the properties of the object.

The controller may determine a rendering progress rate of the current frame and a usage rate of a memory, and a time point at which the graphics pipeline for the following frame starts may be based on the rendering progress rate of the current frame and the usage rate of the memory.

The controller may calculate based on information included in a drawcall related to the following frame.

The controller may calculate the resource based on a time or power for performing the pre-process of transforming the properties of the object.

The controller may determine whether to perform the pre-process based on a time or power for performing the pre-process, a time or power for transforming the properties of the object in the graphics pipeline, and usage frequency of the object.

When the properties of the object are related to a location of the object, the controller may perform a pre-process of transforming coordinates of the location.

When the properties of the object in the following frame are related to a location allocated in a memory to store the object, the controller may perform a pre-process of changing the location allocated in the memory.

Other features and aspects will be apparent from the following detailed description, the drawings, and the claims.

BRIEF DESCRIPTION OF THE DRAWINGS

FIG. 8A is a detailed flowchart illustrating a method of performing a pre-process of transforming a property of an object, according to an embodiment.

DETAILED DESCRIPTION

Figure 1:
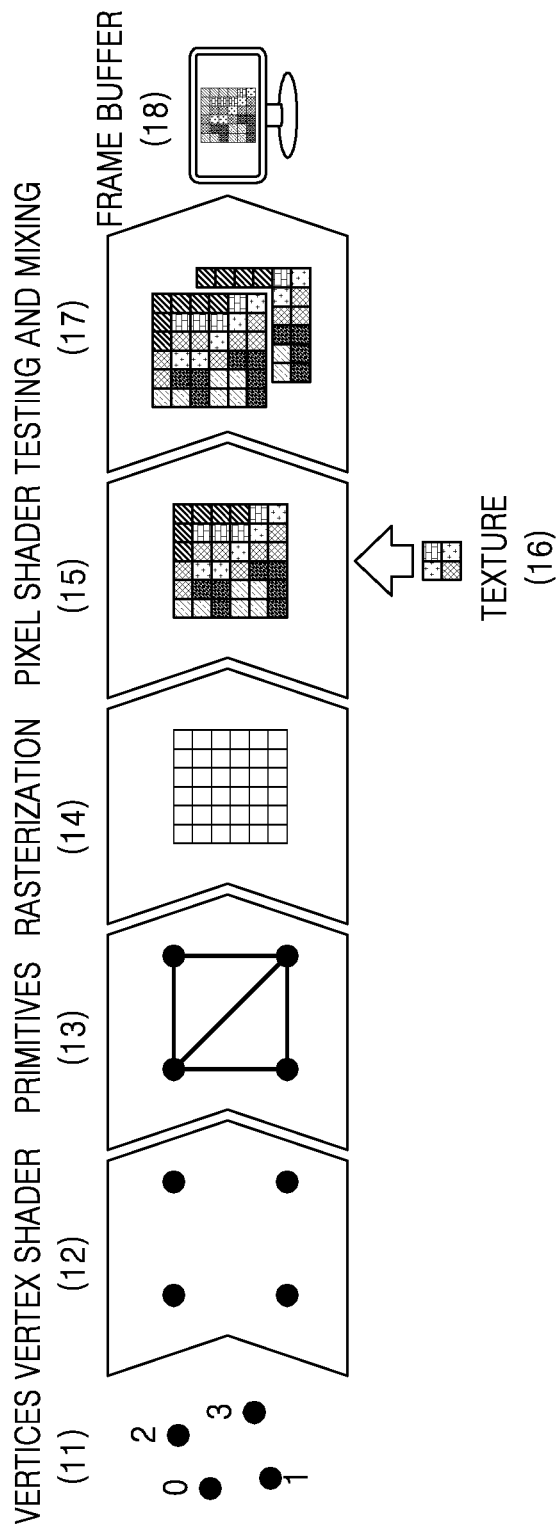
FIG. 1 is a diagram illustrating a graphics processor that processes 3-dimensional (3D) graphics according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that should be understood by one of ordinary skill in the art may be omitted for increased clarity and conciseness.

The features described herein may be embodied in different forms, and are not to be construed as being limited to the examples described herein. Rather, the examples described herein have been provided so that this description will be thorough and complete, and will convey the full scope of the description to one of ordinary skill in the art.

The terms used in describing the embodiments have been selected as terms that generally describe such operations or components in the discussed embodiments, and thus should be understood to also cover new technologies that implement one or more of the below described aspects, and should not be limited to understandings of terms in differing rendering approaches that may have different or narrower meanings or interpreted to conform with any particular rendering approach, unless described otherwise. In specific cases, some terms may have been arbitrarily selected, and in such cases, their meaning will be described in detail or through example. Thus, it should be noted that the terms used in the specification should be understood not based on their literal names but by their given definitions, examples, and descriptions throughout the specification and not in conflict with the same. Various alterations and modifications may be made to embodiments, some of which will be illustrated in detail in the drawings and detailed description. However, it should be understood that these embodiments are not construed as limited to the disclosure and illustrated forms and should be understood to include all changes, equivalents, and alternatives within the idea and the technical scope of this disclosure.

Accordingly, below, in one or more embodiments, one or more processing devices may be specifically configured and/or controlled to implement one or more of the operations or methods discussed herein, with the one or more processing devices being hardware, such as processor(s), computer(s), or other processing hardware. For example, in one or more embodiments, any or any combination of the below operations or methods may be implemented by one or more processing devices upon execution or implementation of processor or computer readable code recorded in or on a memory of a graphics processor or rendering system described below, or another non-transitory recording medium represented with the same. As another example, in one or more embodiments, one or more processing devices may be specially or particularly configured to implement one or more of the operations or methods discussed herein, as only examples, using one or more memories, such as memory 240 of FIG. 2, as only an example. Accordingly, though method operations for differing embodiments will be discussed below through reference to operations of a graphics processor, such as with reference to the graphics processor 210 of FIG. 2, this reference to such a graphics processor is for convenience of explanation and should not be inferred as meaning that the described operations must be implemented by a particularly described graphics processor according to one or more embodiments, but, rather, is available for alternative implementations as well.

FIG. 1 is a diagram illustrating an example of a graphics processor processing 3-dimensional (3D) graphics according to one or more embodiments.

As only an example, the processing of 3D graphics may be divided into three steps, i.e., geometric transformation, rasterization, and pixel shading. Hereinafter, the processing will be described with reference to FIG. 1. In particular, FIG. 1 shows the processing of 3D graphics by performing operations 11 to 18.

In operation 11, vertices are generated. The vertices may be generated to show objects included in the 3D graphics.

In operation 12, the generated vertices are shaded. A vertex shader may shade the vertices by determining locations of the vertices generated in operation 11.

In operation 13, primitives are generated. The primitives indicate points, lines, polygons, etc. which are formed by using at least one vertex. For example, a primitive may be shown as a triangle by connecting vertices, as shown in FIG. 1.

In operation 14, the primitives are rasterized, which refers to dividing the primitives into fragments. A fragment may be a fundamental unit for performing graphics processing on the primitives. Since the primitives only include information about the vertices, fragments are generated between vertices during the rasterization so that the processing of the 3D graphics may be performed.

In operation 15, pixels are shaded. The fragments, which are generated by rasterization and configure the primitives, may correspond to pixels. That is, the terms 'fragment' and 'pixel' may be used interchangeably. For example, a 'pixel shader' may also be referred to as a 'fragment shader.' In general, respective fundamental units of graphics processing that makes up the primitives is referred to as a 'fragment,' and a fundamental unit of graphics processing after the pixel shading may be referred to as a 'pixel.' In the pixel shading operation, colors of the pixels may be determined.

In operation 16, texturing is performed to determine colors of the pixels. Texturing is a process of determining and assigning colors to pixels by using texture, which may be a prepared image (e.g. texture model). The colors of the pixels may be determined by using a prepared texture because determining a color of each of the pixels so as to display many various colors and patterns may require more computation data and longer graphics processing time. For example, the colors of the pixels may be determined by storing an outer surface color of an object as a separate 2-dimensional (2D) image called 'texture,' enlarging or decreasing the stored texture depending on a location on a screen and size of the object, and/or combining pixel values by using textures with various resolutions.

In operation 17, testing and mixing are performed. In operation 17, a final pixel value to be displayed may be determined by performing an alpha test, a stencil test, a depth test, and/or the like on the pixels. The graphics processor may generate 3D graphics that correspond to a single frame by performing the above processes.

In operation 18, the frame generated by operations 11 to 17 is stored in a frame buffer, and the frame stored in the frame buffer is displayed via the shown display apparatus of the corresponding rendering system embodiment, for example.

Figure 2:
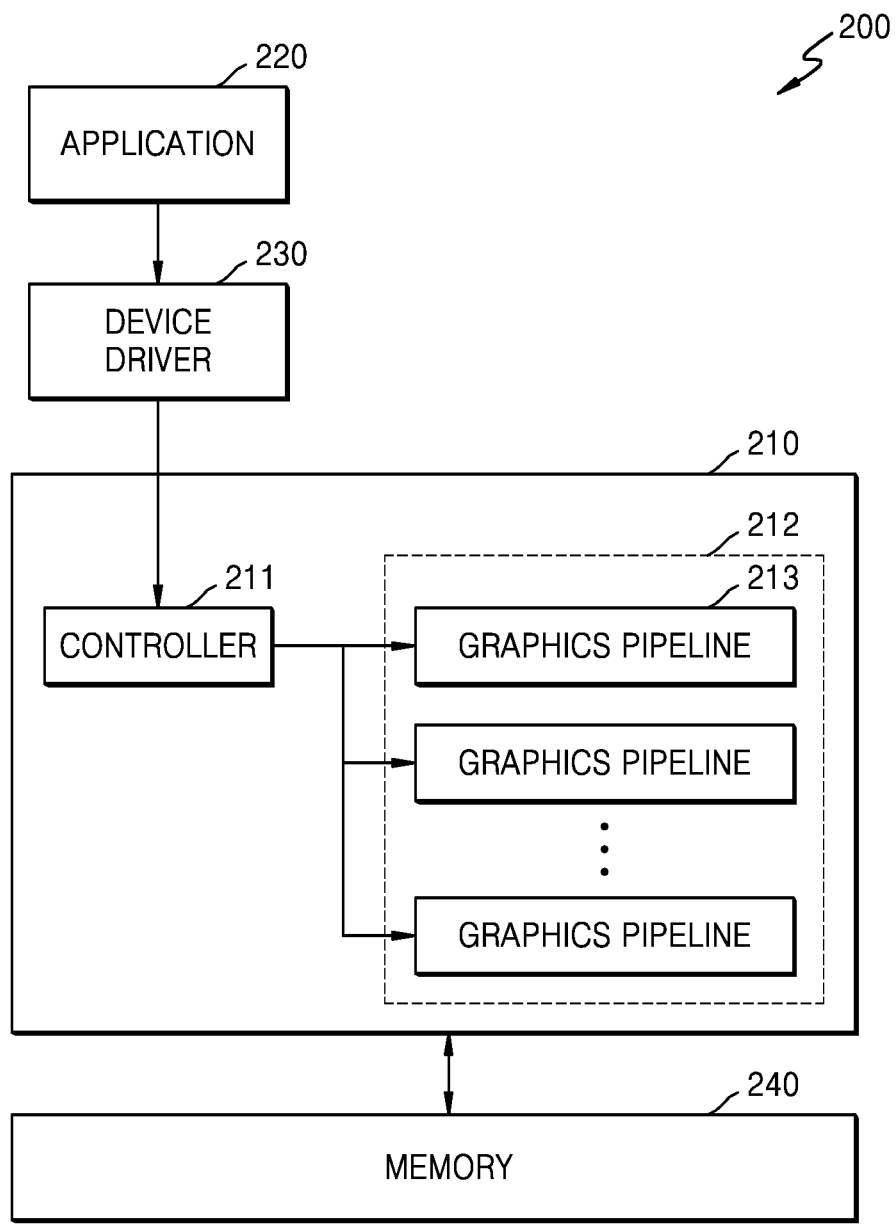
FIG. 2 is a block diagram illustrating a rendering system, according to an embodiment.

FIG. 2 is a block diagram illustrating a rendering system 200, according to an embodiment.

The rendering system 200 may include a graphics processor 210, an application 220, a device driver 230, and a memory 240. The rendering system 200 of FIG. 2 only includes components that are discussed with reference to the embodiments. However, one of ordinary skill in the art, with full understanding of the present specification, would be able to understand that components other than those shown in FIG. 2 may also be included, and some components may be replaced.

The rendering system 200 may be, but is not limited to, a desktop computer, a laptop computer, a smartphone, a personal digital assistant (PDA), a mobile media player, a video game console, a TV set-top box, a tablet device, an e-book reader, a wearable device, or a head mounted display (HMD) device. That is, the rendering system 200 is an apparatus for graphics processing and displaying content. Various apparatuses may be included in the category of the rendering system 200.

The application 220 represents a processor of the rendering system 200 that is executing an application that may provide 3D graphics rendering information to the device driver 230 based on an application programming interface (API) such as OpenGL, OpenGL ES, DirectX, or the like.

The device driver 230 may be software, such as the one executed by the processor of the rendering system 200, for controlling an interface between hardware and such application programs and between operating systems. The device driver 230 may analyze the API received from the application 220, convert the API into a command that may be processed by the graphics processor 210, and transmit the command to the graphics processor 210. A draw command indicates an object to be rendered in an image or a frame. According to an embodiment, the draw command may be expressed as 'drawcall.' For example, the draw command may be a command for drawing a number of quadrilaterals or triangles in the image or the frame.

The object refers to information that is received or used in a graphics pipeline to render the 3D graphics. For example, the object may be an item included in the 3D graphics which is to be rendered according to the draw command. That is, the object may include, but is not limited to the vertices and primitives used by the graphics pipeline to render the item. The object may have a property. The property of the object may include some or all of the information that relates to features of the object. For example, the property of the object may include, but is not limited to, location information of the object in the frame, a location allocated in the memory to store the object, and/or a variable type.

The graphics processor 210 executes the graphics pipeline, and may correspond to a graphics processor that includes a graphics processing unit (GPU), for example. That is, the graphics processor 210 may be hardware that executes a 3D graphics pipeline to render 3D objects on a 3D image to a displayable 2D image. For example, the graphics processor 210 may perform not only shading, blending, and illuminating, but also, various operations for generating pixel values of pixels to be displayed.

Based on the draw command related to the 3D graphics, received from the device driver 230, the graphics processor 210 may selectively, for example, perform tile-based rendering (TBR) and/or tile-based deferred rendering (TBDR).

As shown in FIG. 2, the graphics processor 210 may include a controller 211 and a renderer 212. The renderer 212 may execute a plurality of graphics pipelines 213.

The controller 211 may receive at least one draw command related to the 3D graphics from the device driver 230. According to an embodiment, the controller 211 may divide the at least one draw command into units of batches, and allocate the batches to the graphics pipelines that are executed in the renderer 212. For example, the controller 211 may divide one-hundred draw commands related to the primitives into batches of twenty draw commands related to primitives, and thus, five batches of draw commands may be allocated to a plurality of graphics pipelines.

The graphics pipeline of the renderer 212 may perform tile binning on the 3D graphics according to allocated batches. Heretofore, embodiments have been described based on tile-based deferred rendering for convenience of description. However, the embodiments may be also based on other rendering methods.

Tile binning will be described below with reference to other drawings.

The memory 240 may be hardware for storing data processed by the rendering system 200. Data processed and data to be processed by the graphics processor 210 may be stored in the memory 240. Additionally or alternatively, the memory 240 may store applications, drivers, etc. that are to be driven by the device driver 230 and the graphics processor 210. The memory 240 may include random access memory (RAM) such as dynamic random access memory (DRAM) or static random access memory (SRAM), read-only memory (ROM), electrically erasable programmable read-only memory (EEPROM), CD-ROM, Blu-Ray® or other optical disk storage, hard disk drive (HDD), solid state drive (SSD), or flash memory. Furthermore, the memory 240 may include other external storage devices that may access the rendering system 200.

Figure 3:
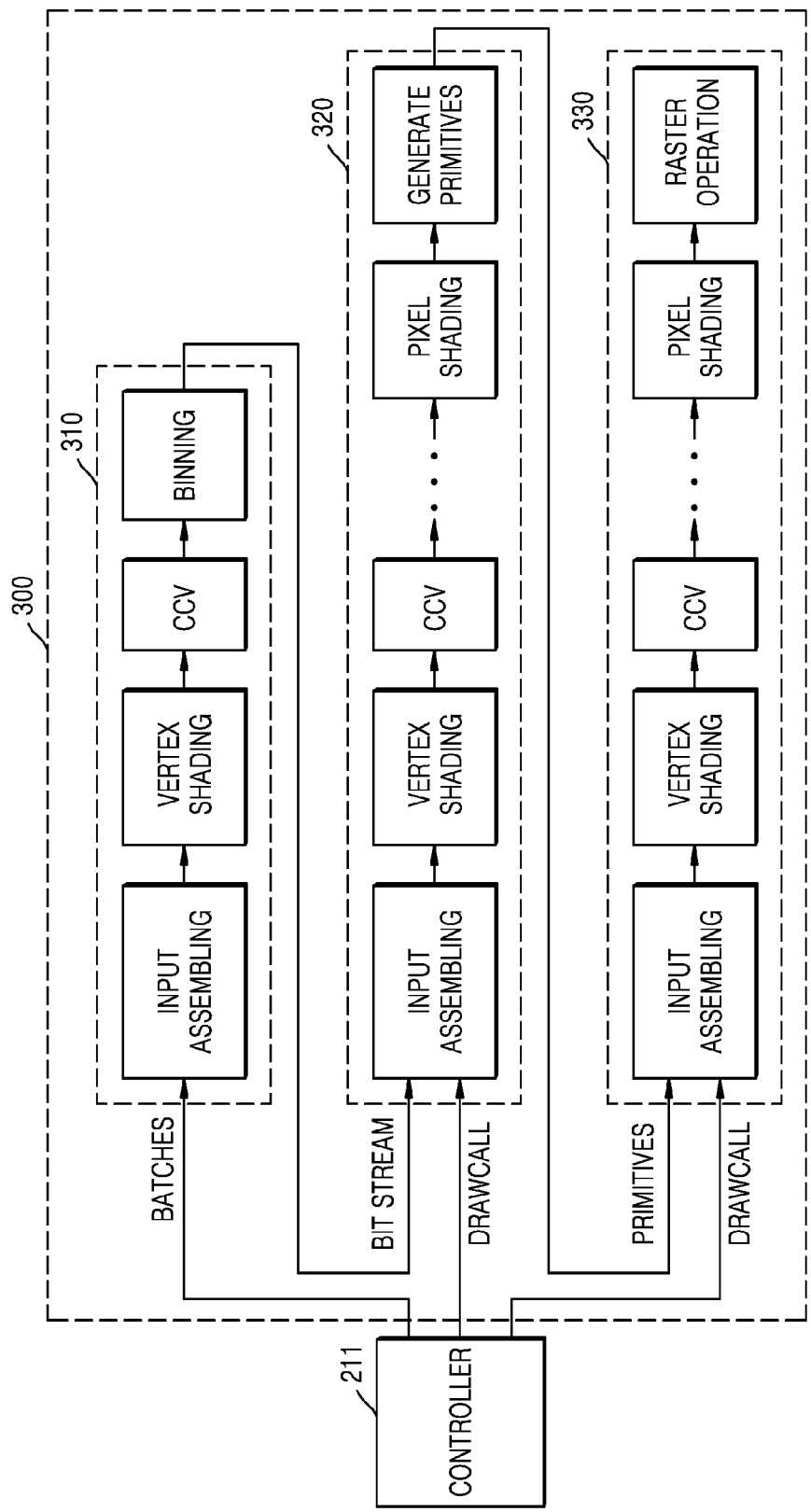
FIG. 3 is a block diagram illustrating a graphics pipeline of tile-based deferred rendering, according to an embodiment.

FIG. 3 is a block diagram illustrating a graphics pipeline 300 of tile-based deferred rendering according to an embodiment.

The graphics processor 210 may use tile-based rendering to render 3D graphics that correspond to a single frame. In other words, before the rasterization operation 14 of FIG. 1, the graphics processor 210 may divide a frame into a plurality of uniformly-sized tiles, and perform operations after the rasterization operation 14 in tile units. Although an operation of processing vertex information in tile units and an operation of configuring a frame by gathering the tiles after the operation in tile units are performed, information loaded in the memory 240 may be reduced into tile units. In one or more embodiments, since tile unit parallel processing is possible after the rasterization operation 14, parallel processing efficiency may be improved.

During tile-based rendering, texturing and shading may be performed on a pixel related to an invisible surface. In order to solve this problem, the graphics processor 210 may perform tile-based deferred rendering. In tile-based deferred rendering, rendering is not performed before all polygon information used in a current frame arrives. Also, texturing and shading may be delayed until a surface shown in each pixel is determined. Therefore, even though shading may be delayed, the memory may be used efficiently because polygons in an invisible surface are not processed.

Referring to FIG. 3, tile-based deferred rendering refers to rendering that includes sequentially performing a binning pass 310, a Z-prepass 320, and a color pass 330. The binning pass 310 is a pass that generates tile binning. Tile binning may be a process of dividing 3D graphics into a number of tiles, and generating binning information that indicates whether at least one draw command is performed on the tiles in the 3D graphics. The binning pass 310 may include stages such as input assembling, vertex shading, culling, clipping, and viewport (CCV) transformation, binning, and storing information about primitives in the tiles determined by binning in a tile bitstream.

The Z-prepass 320 is a pass for removing primitives that are distinguished by identifying depths in tile units, and generating primitives by using a received drawcall and bitstream. The Z-prepass 320 may include stages such as input assembling, vertex shading, CCV transformation, pixel shading, and generating of primitives, for example.

Lastly, the color pass 330 may render primitives other than the removed primitives. The color pass 330 may include stages such as input assembling, vertex shading, CCV transformation, pixel shading, raster operation, and outputting of a rendering image, for example.

Referring to FIG. 3, each of the three passes includes input assembling, vertex shading, and CCV transformation. Therefore, a property of the object that is to be transformed in the overlapping operations may be pre-processed, i.e., transformed before the binning pass 310, and the transformed property may be stored in the memory 240. Then, since transformation does not have to be reported at each pass, graphics processing efficiency may be improved. For example, by using tile-based deferred rendering, vertex shading is performed three times on properties of the object in the 3D graphics. Vertices that are received during vertex shading may be regarded as an object, and locations of the vertices may be a property of the object. Since the locations of the vertices are set during vertex shading, the locations of the vertices may be transformed into coordinates according to various coordinate systems. Thus, when the graphics processor 210 transforms the coordinates of the vertices, which are to be transformed during vertex shading, before the binning pass 310, rendering may be performed by using the transformed coordinates without repeating identical coordinate transformation in the vertex shading operation of each subsequent pass. Although the above embodiment has been described based on tile-based deferred rendering, one of ordinary skill in the art would be able to understand that a pre-process method may be applied to rendering methods other than the rendering described above.

Although FIG. 3 shows only three overlapping operations, one of ordinary skill in the art having a full understanding of the present description would be able to understand that operations in addition to or other than those described above may also be included.

Figure 4:
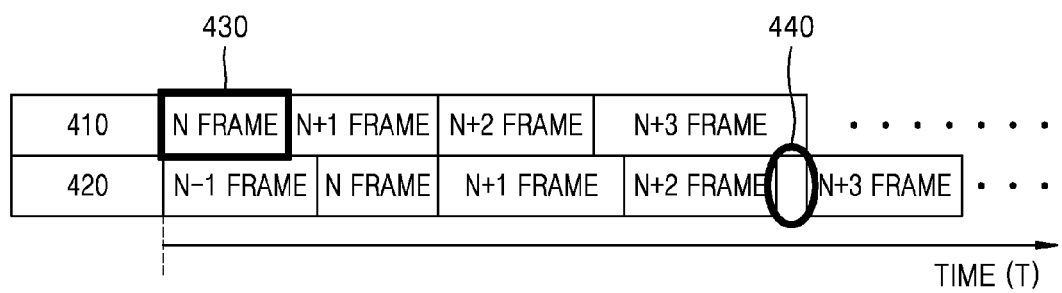
FIG. 4 is a diagram illustrating frames on which a pre-process is performed and frames rendered by a graphics pipeline with respect to a time axis, according to an embodiment.

FIG. 4 is a diagram illustrating frames on which a pre-process is performed and frames rendered by a graphics pipeline with respect to a time axis, according to an embodiment.

Referring to FIG. 4, a frame array 410 at an upper section refers to frames on which a pre-process is performed, and a frame array 420 at a lower section refers to frames on which a graphics pipeline is executed. For example, while a pre-process is performed on an N frame 430, the graphics pipeline may be executed on an (N−1) frame (N is a natural number). The (N−1) frame indicates a previous frame of the N frame 430. A time taken to perform the pre-process or execute the graphics pipeline may vary according to frames. Therefore, when it is assumed that the pre-process and stages of the graphics pipeline are sequentially executed for each frame, rendering may be stopped at a section 440 because the pre-process is not finished before the graphics pipeline is executed. For example, referring to FIG. 4, a pre-process of an (N+3) frame may be finished later than a graphics pipeline of an (N+2) frame. In this case, the renderer 212 may not execute a graphics pipeline on the (N+3) frame immediately after the graphics pipeline of the (N+2) frame is finished. Thus, performance of the renderer 212 may deteriorate.

Hereinafter, examples of pre-processes performed according to properties of an object will be further described with reference to FIGS. 5A to 5D and 6A to 6C.

FIGS. 5A to 5D are diagrams illustrating embodiments of a pre-process that is performed when a property of an object is related to a location of the object. Since a 3D graphics rendering result is displayed 2-dimensionally, 3D coordinates in a graphics pipeline have to be transformed into 2D coordinates. Therefore, when the property of the object is related to the location of the object, the graphics processor 210 may perform a pre-process of transforming coordinates.

Figure 5A:
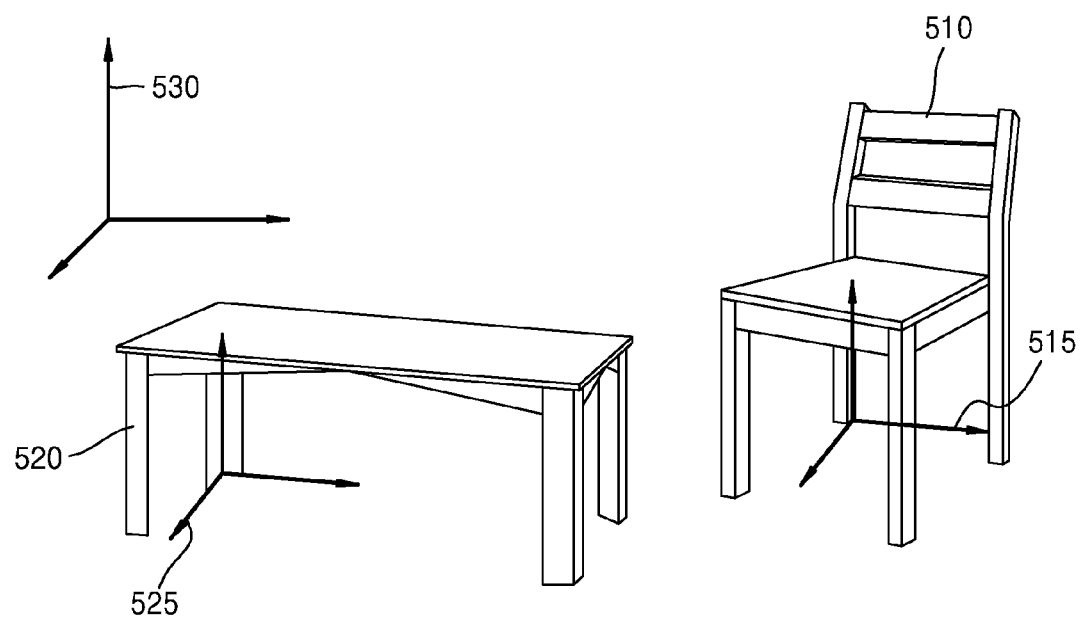
FIG. 5A is a diagram illustrating a pre-process of transforming coordinates when performing model transformation, according to an embodiment.

In particular, FIG. 5A is a diagram illustrating a pre-process of transforming coordinates when performing model transformation, according to an embodiment.

3D model primitives may be transformed from a local coordinate system into a world coordinate system by model transformation. When the primitives are assumed to be an object, coordinates in a certain coordinate system may be included as a property of the object. Referring to FIG. 5A, a chair 510 (or table 520) may have its own local coordinate system 515 (or 525), Also, the origin of the local coordinate system 515 of the chair 510 may be at a leg of the chair 510. When the chair 510 is moved or transformed to a world coordinate system 530 called 'living room,' the origin is moved to the origin of the world coordinate system 530, and thus, coordinates of the chair 510 may be modified. Such a process is referred to as model transformation. That is, when the property of the object is related to local coordinates of the object, the graphics processor 210 may perform a pre-process of transforming the coordinates into coordinates in a world coordinate system.

Figure 5B:
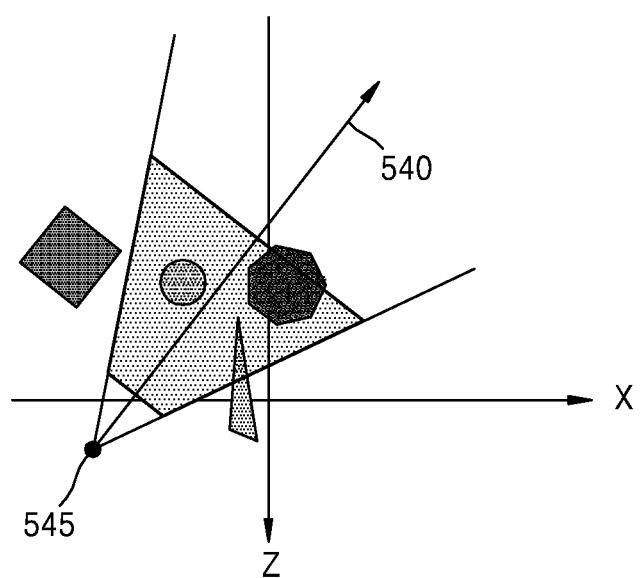
FIGS. 5B and 5C are diagrams illustrating a pre-process of transforming coordinates when performing viewing transformation, according to an embodiment.
Figure 5C:
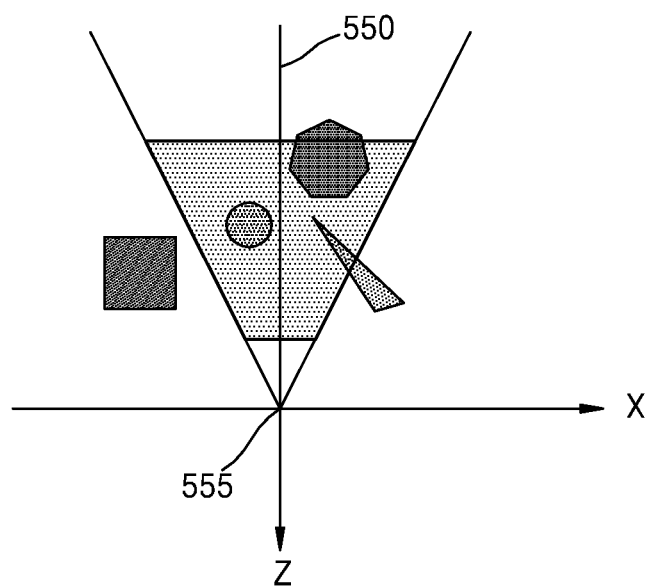

FIGS. 5B and 5C are diagrams illustrating a pre-process of transforming coordinates when performing viewing transformation, according to an embodiment.

Viewing transformation refers to moving a viewpoint to the origin of a world coordinate system. Referring to FIG. 5B, a location 545 of a camera is different from the origin of the world coordinate system, and a direction 540 of the camera is different from a coordinate axis. Therefore, coordinate calculation may be complicated when rotating or moving an item. In this case, as shown in FIG. 5C, the graphics processor 210 may match the location 545 with an origin 555 by performing viewing transformation, and match the direction 540 with a coordinate axis 550.

Figure 5D:
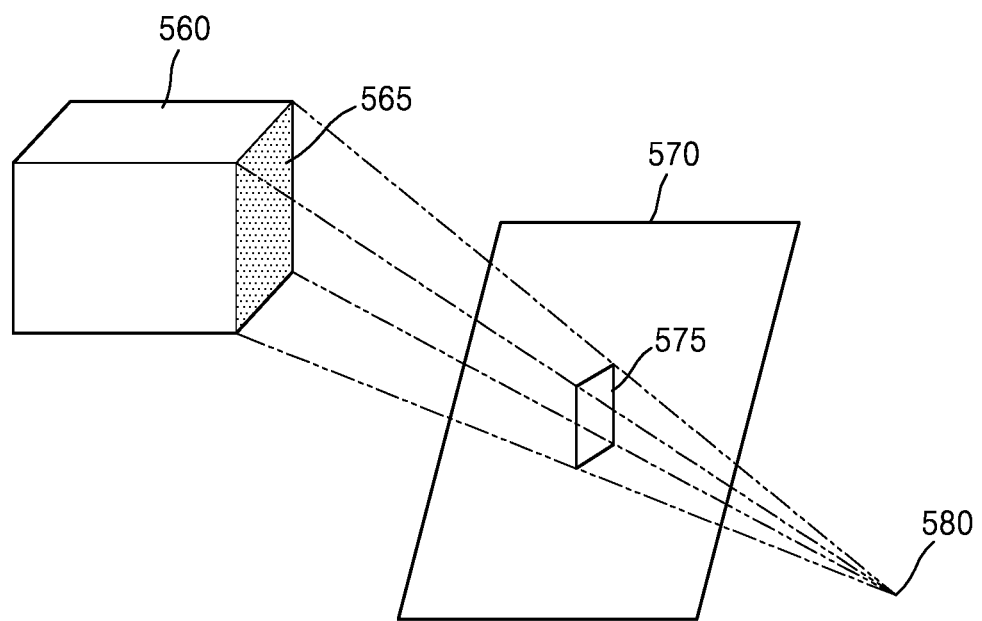
FIG. 5D is a diagram illustrating a pre-process of transforming coordinates when performing projection transformation, according to an embodiment.

FIG. 5D is a diagram illustrating a pre-process of transforming coordinates when performing projection transformation, according to an embodiment.

Projection transformation refers to transforming 3D graphics into 2D graphics by drawing a 3D projection based on a viewpoint. FIG. 5D shows a perspective projection, that is, a method of projecting a plane 565 of an item 560 on a view plane 570 with respect to the center of projection 580. The view plane 570 may be referred to as a reference projection plane.

For example, when a property of the object is a location of the 3D graphics, the graphics processor 210 may perform a pre-process of transforming the property of the object into coordinates on a view plane 575.

Figure 6A:
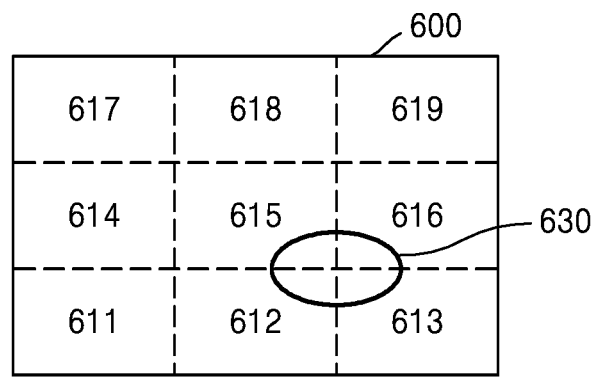
FIG. 6A is a diagram illustrating an object displayed over a plurality of areas, according to an embodiment.
Figure 6B:
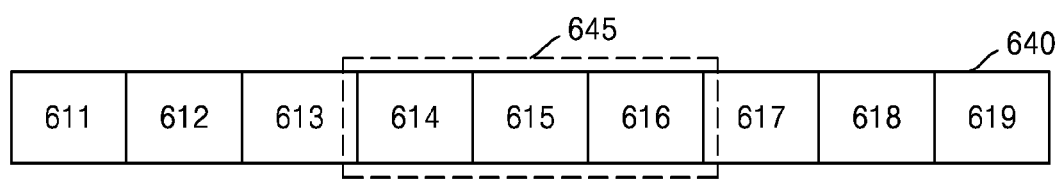
FIG. 6B is a diagram illustrating areas in 3D graphics stored in a memory, according to an embodiment.
Figure 6C:
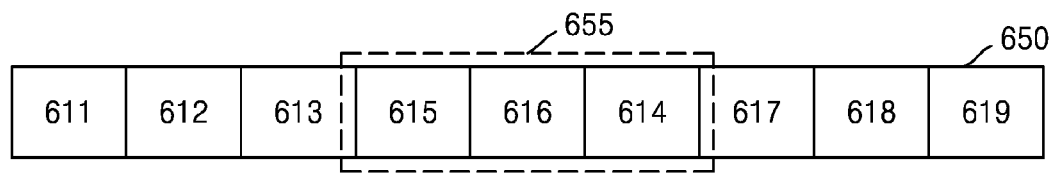
FIG. 6C is a diagram illustrating performance of a pre-process of a property of an object when the property is about a location allocated in a memory to store the object, according to an embodiment.

FIGS. 6A to 6C are diagrams of embodiments of performing pre-processes of a property of an object when the property is related to a location allocated in the memory to store the object.

FIG. 6A is a diagram illustrating an object displayed over a plurality of areas, according to an embodiment.

Referring to FIG. 6A, 3D graphics 600 may include a plurality of areas 611 to 619. When an object 630 is displayed over the areas 612, 613, 615, and 616, information about the four areas 612, 613, 615, and 616 may be used to render the object 630.

FIG. 6B is a diagram illustrating areas in which 3D graphics are stored in a memory, according to an embodiment.

The graphics processor 210 accesses an address allocated to each piece of area information in memory 640 (example of the memory 240) to render the object 630. In this case, the area information is stored in the memory 240 according to an array order 645 shown in FIG. 6B. Since area information may be loaded by the graphics processor 210 notwithstanding the array order 645, the graphics processor 210 accessing the memory 240 may be less efficient.

FIG. 6C is a diagram illustrating performing a pre-process of a property of an object when the property is about a location allocated in a memory to store the object, according to an embodiment.

Unlike FIG. 6B, when area information is stored in memory 650 (example of the memory 240), according to an array order 655 as shown in FIG. 6C, the graphics processor 210 may sequentially access the memory 240 according to the array order 655 of the memory 240 and perform rendering. Therefore, when the property of the object is related to a location allocated in memory 240 to store the object, the graphics processor 210 may perform a pre-process of changing an order stored in the memory 240, and thus may more efficiently perform graphics processing compared to the case shown in FIG. 6B.

According to an embodiment, the property of the object may include a variable type. For example, when a variable is the object received via a graphics pipeline, the variable type may be the property of the object. For example, the property of the object may be that the variable type is an integer or real number (double or float). However, the variable type is not limited thereto. The variable type may be transformed while executing the graphics pipeline. For example, even when the variable type of a variable received via the graphics pipeline is an integer, the variable type may be transformed to a double or a float in any operation while executing the graphics pipeline. Therefore, a pre-process of transforming the variable type may be performed before executing the graphics pipeline.

According to an embodiment, the property of the object may include a data size of the object. The graphics processor 210 may perform a pre-process of compressing and transforming the object. For example, an object may be loaded many times in the memory 240 while executing the graphics pipeline. When data of the object is large, performance of the graphics processor 210 may deteriorate due to the frequent loading in the memory 240. In this case, the graphics processor 210 may perform a pre-process of compressing and transforming the data of the object and storing it in the memory 240 before executing the graphics pipeline. Accordingly, graphics processing efficiency may be improved because a compressed object may be used while executing the graphics pipeline.

One of ordinary skill in the art, upon full understanding of the present specification, would be able to understand that a pre-process related to properties of the object other than the above properties may be performed.

Figure 7:
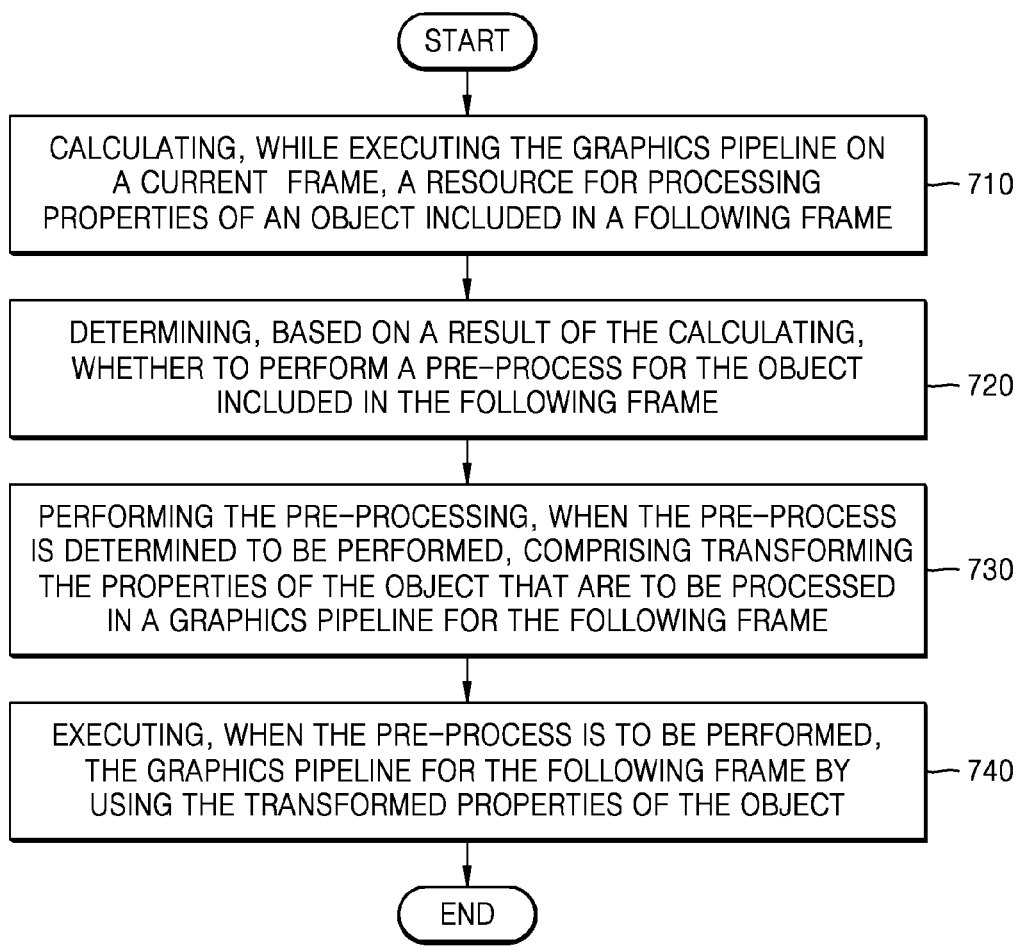
FIG. 7 is a flowchart illustrating a method of executing a graphics pipeline, according to an embodiment.

FIG. 7 is a flowchart illustrating of a method of executing a graphics pipeline, according to an embodiment.

In operation 710, the graphics processor 210 may calculate a resource for processing properties of an object in a following frame while executing the graphics pipeline on a current frame. The calculated resource may be related to time benefit or power benefit. A calculation method will be described below.

In operation 720, based on a calculation result for the resource, the graphics processor 210 may determine whether to perform a pre-process for the object included in the following frame in advance, i.e., before.

In operation 730, when the graphics processor 210 determines that the pre-process should be performed, the graphics processor 210 may perform the pre-processing, comprising transforming the properties of the object that are to be processed in a graphics pipeline for the following frame.

In operation 740, the graphics processor 210 may execute the graphics pipeline for the following frame by using the transformed properties of the object when the pre-process is to be performed.

Figure 8B:
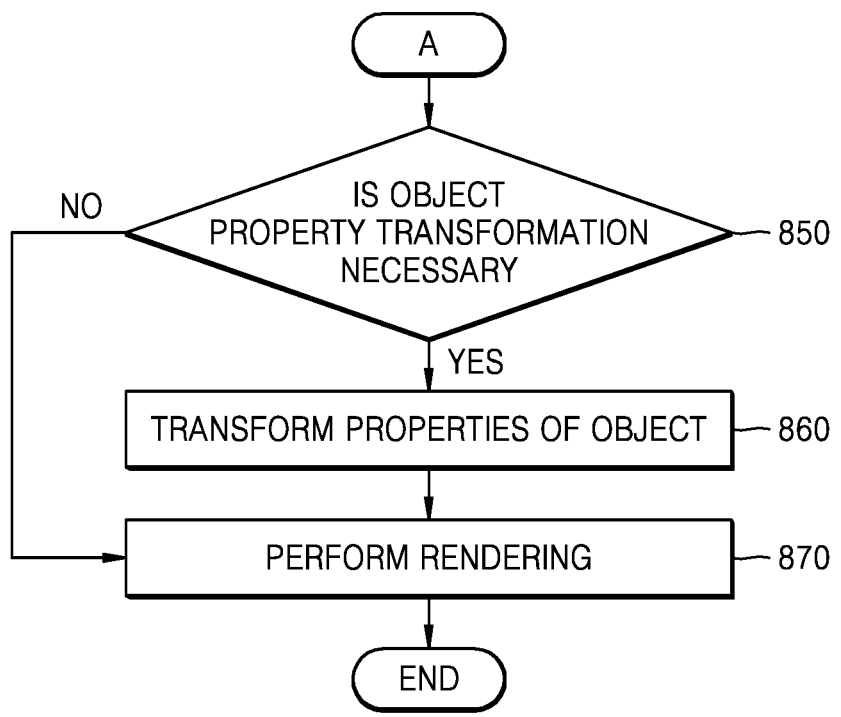
FIG. 8B is a detailed flowchart illustrating a method of executing a graphics pipeline, according to an embodiment.

FIGS. 8A and 8B are detailed flowcharts illustrating a pre-process of executing a graphics pipeline, according to an embodiment.

FIG. 8A is a detailed flowchart illustrating a method of performing a pre-process of transforming a property of an object, according to an embodiment.

In operation 810, the controller 211 may receive a property of an object included in a following frame from the device driver 230. The property of the object may be included in a drawcall, for example, and then received by the controller 211.

In operation 820, the controller 211 may determine whether the pre-process is finished before a graphics pipeline for the following frame starts. For example, assuming that $T_1$ represents a time for performing the pre-process of the property of the object in the following frame, and $T_2$ represents a remaining time until rendering of the following frame starts, an example Inequality 1 may be calculated in operation 820, as follows:

$$T_1 < T_2 \times A$$

Here, 'A' represents a memory usage rate, and in particular, a ratio of a memory operation time period to a recent time period. Therefore, '$T_2 \times A$' may be defined as a time for using memory among a time remaining before rendering of the following frame starts. $T_1$ may be calculated based on a time for loading a property of the object that is to be transformed from the memory 240, e.g. the time required for the loading. The time for loading the object from the memory 240 may vary according to a size of the property of the object. Also, $T_2$ and A may be obtained by monitoring status information of the renderer 212 and status information of the memory 240, respectively. For example, $T_2$ may be calculated based on a rendering progress rate of a current frame, which is monitored by the renderer 212. Also, 'A' may correspond to information monitored by the memory 240.

When $T_1$ is smaller than '$T_2 \times A$', operation 830 may be performed. If not, the pre-process may end.

According to an embodiment, the controller 211 may determine whether the pre-process may be performed based on $T_1 < T_2$ in operation 820. For example, when the memory 240 cannot be monitored or a monitoring result is inaccurate, the $T_1 < T_2$ criteria may be used regardless of the memory usage rate A.

According to an embodiment, in operation 820, when the renderer 212 and the memory 240 cannot be monitored or a monitoring result is inaccurate, the controller 211 may determine $T_1$ and $T_2$ by analyzing information included in a drawcall.

In operation 830, it is determined whether a performance benefit may be obtained if the property of the object is transformed before executing a graphics pipeline. When a performance benefit may be obtained by pre-processing the property of the object, the controller 211 may perform operation 840. If the determination is made that there is no performance benefit, the pre-process may end and the graphics pipeline may be executed. The performance benefit may include time benefit and/or power benefit.

In operation 840, the controller 211 may perform the pre-process of transforming the property of the object. For example, when the property of the object is related to a location of the object, the pre-process may include coordinate transformation. When the property of the object is related to a location allocated in the memory 240 to store the object, the pre-process may include changing the location allocated in the memory 240. When the object includes a variable, the pre-process may include variable type transformation. When the property of the object includes a data size, the pre-process may include compressing the object. One of ordinary skill in the art, upon a complete understanding of the present specification, would be able to understand that the pre-process may be performed on properties other than those described above.

FIG. 8B is a detailed flowchart illustrating a method of executing a graphics pipeline, according to an embodiment.

In operation 850, the renderer 212 may determine whether transformation of the property of the object is determined to be performed in the graphics pipeline. When the transformation is determined to be performed, operation 860 may be performed, and if not, operation 870 may be performed. In operation 850, whether the property of the object needs to be processed may be determined by identifying whether a pre-processed property of the object is stored in the memory 240. However, embodiments are not limited thereto.

In operation 860, the renderer 212 may transform the property of the object via the graphics pipeline. When the property of the object is related to a location allocated in the memory 240, the property of the object is maintained even when the pre-process has not been performed. This is because information is loaded in the memory 240 before executing the graphics pipeline. Therefore, while executing the graphics pipeline, a location in the memory 240 where the object is stored is not changed even when the pre-process has not been performed.

In operation 870, the renderer 212 may perform rendering. The rendering method may include, but is not limited to, tile-based deferred rendering described with reference to FIG. 3, as only an example, or tile-based rendering.

Figure 9:
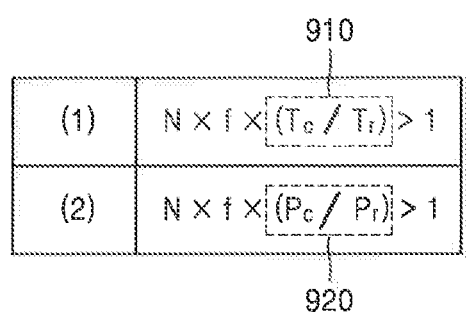
FIG. 9 is a diagram illustrating exemplary criteria for determining whether to perform a pre-process on a property of an object, according to an embodiment.

FIG. 9 is a diagram illustrating criteria for determining whether to perform a pre-process on a property of an object, according to an embodiment and only as an example.

One of ordinary skill in the art, upon full understanding of the present specification, would understand that various criteria other than those shown in FIG. 9 may be applied to the embodiments.

Inequalities (1) and (2) of FIG. 9 respectively indicate criteria that may be used to determine whether pre-processing would result in any or sufficient time benefit and a criteria to determine whether pre-processing would result in any or sufficient power benefit. In Inequality (1), N represents the number of passes in the rendering method of the renderer 212. For example, when the tile-based deferred rendering of FIG. 3 is applied in the renderer 212, N may be equal to 3. 'f' represents usage frequency of an object that is to be pre-processed. 'f' may be estimated by analyzing information of the object when frame information is received by the graphics processor 210. Expression 910 represents time benefit. $T_c$ represents a time taken for the controller 211 to transform the property of the object, and $T_r$ represents a time taken for the renderer 212 to transform the property of the object. Therefore, the expression 910 may be understood as a ratio between the time taken by the renderer 212 and the time taken by the controller 211 when the renderer 212 and the controller 211 perform identical calculations. The controller 211 may calculate the expression 910 for each transformation by estimating a plurality of times, and may store the calculation results. According to Inequality (1), the controller 211 may determine that there is time benefit when the product of the number of passes, the usage frequency of the object, and a time ratio (the expression 910) is greater than 1.

In Inequality (2), N and f are the same as in Inequality (1). $P_c$ and $P_r$ respectively indicate power consumed as the property of the object is transformed by the controller 211 and by the renderer 212. Therefore, an expression 920 indicates a ratio of power consumed by the renderer 212 and power consumed by the controller 211 when the renderer 212 and the controller 211 perform identical calculations. According to Inequality (2), the controller 211 may determine that there is power benefit when the product of the number of passes, the usage frequency of the object, and the power ratio (the expression 920) is greater than 1.

Performance benefit may include time benefit and power benefit, e.g. reduced power expenditures. Therefore, the controller 211 may determine that the pre-process of the property of the object is performed only when Inequalities (1) and (2) are satisfied. The right hand side of Inequalities (1) and (2) may set different reference values about performance and power instead of 1. Alternatively, according to an embodiment, the controller 211 may perform the pre-process of the property of the object when any one of Inequalities (1) and (2) is satisfied.

Figure 10:
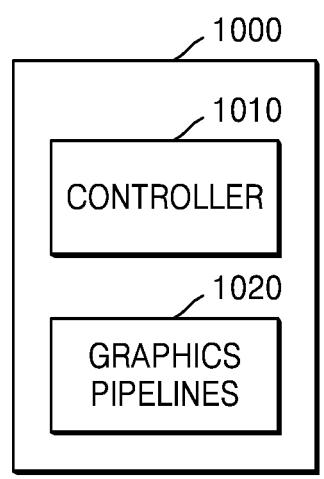
FIG. 10 is a block diagram illustrating a graphics processor, according to an embodiment.

FIG. 10 is a block diagram illustrating a graphics processor 1000, according to an embodiment.

Referring to FIG. 10, the graphics processor 1000 may include a controller 1010 and a graphics pipelines 1020. The graphics processor 1000 of FIG. 10 may be similar in structure and operation as the graphics processor 210 described above with reference to FIG. 2. Graphics processor 1000 shown in FIG. 10 is illustrated with only components that are related to the below-described embodiment. However, one of ordinary skill in the art, upon full understanding of the present specification, would be able to understand that components in addition to or replacing those shown in FIG. 10 may also be included.

The controller 1010 may calculate, while executing one of the graphics pipelines 1020 for a current frame, a resource for processing properties of an object in a following frame, and determine whether to perform a pre-process of transforming the properties of the object to be processed in one of the graphics pipelines 1020 for the following frame in advance.

According to an embodiment, the controller 1010 may determine whether the pre-process is finished before one of the graphics pipelines 1020 for the following frame starts, and then calculate the resource. In this case, a time taken for performing the pre-process may be determined based on a time for loading the property of the object from the memory 240. The time for loading from the memory 240 may be determined based on a size of the property of the object, for example.

According to an embodiment, the controller 1010 may monitor a rendering progress rate of the current frame and a usage rate of the memory 240, and determine a time point when one of the graphics pipelines 1020 for the following frame starts based on the rendering progress rate of the current frame and the usage rate of the memory 240.

According to an embodiment, the controller 1010 may analyze information included in a drawcall about the following frame, and use the information to determine whether the pre-process is finished before one of the graphics pipelines 1020 for the following frame starts.

When the pre-process is to be performed, the controller 1010 may execute the one graphics pipeline for the following frame by using properties of the object that are transformed in advance. When the pre-process is not to be performed, the controller 1010 may transform the properties of the object in the one graphics pipeline.

One or more embodiments can be implemented through computer-readable code/instructions, such as a computer-executed program module, stored in/on a medium, e.g., a non-transitory computer-readable recording medium. The non-transitory computer-readable recording medium may be a random computer-accessible medium, and may include volatile media, non-volatile media, separable media and/or non-separable media. Also, the non-transitory computer-readable recording medium may correspond to any computer storage media and communication media. The computer storage media includes volatile media, non-volatile media, separable media and/or non-separable media which are implemented by using a method or technology for storing information, such as computer-readable code/instructions, data structures, program modules, or other data. The communication media generally includes computer-readable code/instructions, data structures, program modules, or other transmission mechanisms, and random information transmission media.

The apparatuses, units, modules, devices, and other components illustrated in FIGS. 2, 3 and 10 that perform the operations described herein with respect to FIGS. 1-10 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-10. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described herein with respect to FIGS. 1-10 are performed by a processor or a computer as described above executing instructions or software to perform the operations described herein.

Instructions or software to control a processor or computer hardware components of the apparatus or systems described above to perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which describe algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this description includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method comprising:
executing a graphics pipeline by a graphics processor coupled to a memory, the executing comprising:
while executing the graphics pipeline on a current frame, receiving properties of an object included in a following frame;
determining whether a time benefit is obtainable if a pre-process of the object in the following frame is performed, the time benefit being obtainable when:

$$N \times f \times (T_c/T_r) > 1,$$

where N represents a number of passes in a rendering process when executing the graphics pipeline, f represents usage frequency of the object that is to be pre-processed, $T_c$ represents a time taken for a controller to transform a property of the object, and $T_r$ represents a time taken for a renderer to transform a property of the object;
performing the pre-process, when it is determined that the time benefit is obtainable, otherwise skipping the pre-process; and
executing, when the pre-process is to be performed, the graphics pipeline for the following frame by using the transformed property of the object.

2. The method of claim 1, wherein, when the graphics pipeline is a graphics pipeline for tile-based deferred rendering, the pre-process is performed before a pass for tile binning.

3. The method of claim 1, wherein, when the property of the object relates to a location of the object, the pre-process comprises transforming coordinates of the location.

4. The method of claim 1, wherein, when the property of the object in the following frame relates to a location of a graphics area allocated in the memory to store the object, the pre-process comprises changing the location of the graphics area allocated in the memory by changing an array order of graphics areas stored in the memory.

5. A non-transitory processor-readable recording medium having recorded thereon coding to control one or more processor devices to implement a method of executing a graphics pipeline, wherein the method comprises:
while executing the graphics pipeline on a current frame, receiving properties of an object included in a following frame;
determining whether a time benefit is obtainable if a pre-process of the object in the following frame is performed, the time benefit being obtainable when:

$$N \times f \times (T_c/T_r) > 1,$$

where N represents a number of passes in a rendering process when executing the graphics pipeline, f represents usage frequency of the object that is to be pre-processed, $T_c$ represents a time taken for a controller to transform a property of the object, and $T_r$ represents a time taken for a renderer to transform a property of the object;
performing the pre-process, when it is determined that the time benefit is obtainable, otherwise skipping the pre-process; and
executing, when the pre-process is to be performed, the graphics pipeline for the following frame by using the transformed properties of the object.

6. A rendering system comprising:
a memory; and
a graphics processor configured to:
   while executing a graphics pipeline on a current frame, receive properties of an object included in a following frame;
   determine whether a time benefit is obtainable if a pre-process of the object in the following frame is performed, the time benefit being obtainable when:

$$N \times f \times (T_c/T_r) > 1,$$

where N represents a number of passes in a rendering process when executing the graphics pipeline, f represents usage frequency of the object that is to be pre-processed, $T_c$ represents a time taken for a controller to transform a property of the object, and $T_r$ represents a time taken for a renderer to transform a property of the object;
   perform the pre-process, when it is determined that the time benefit is obtainable, otherwise skip the pre-process; and
   execute, when the pre-process is to be performed, the graphics pipeline for the following frame by using the transformed properties of the object.

7. The rendering system of claim 6, wherein when the property of the object relates to a location of the object, the graphics processor performs a pre-process of transforming coordinates of the location.

8. The rendering system of claim 6, wherein when the property of the object in the following frame relates to a location of a graphics area allocated in a memory to store the object, the graphics processor performs a pre-process of changing the location of the graphics area allocated in the memory by changing an array order of graphic areas stored in the memory.

* * * * *